May 25, 1954 J. W. TOOKE 2,679,472
SEPARATION OF HYDROCARBONS BY AZEOTROPIC DISTILLATION
Filed Dec. 10, 1951
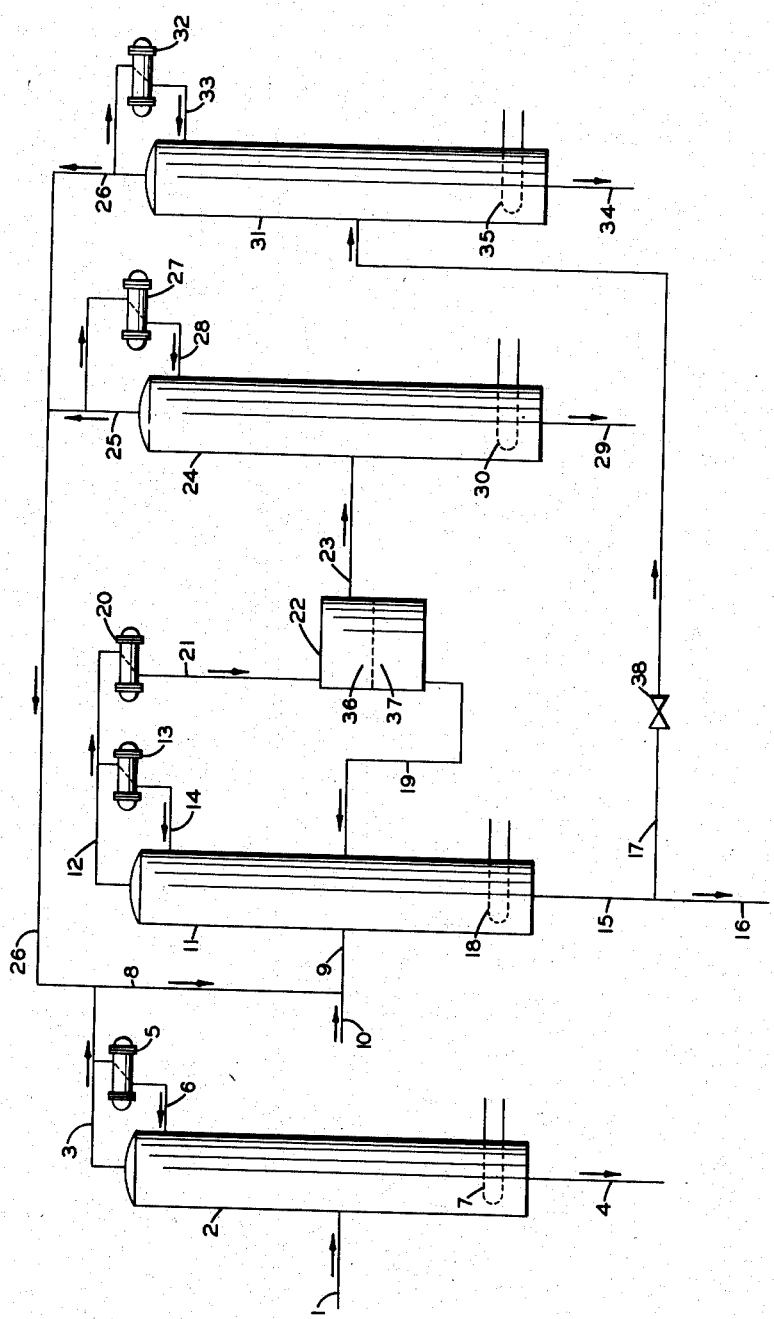
INVENTOR.
J.W. TOOKE
BY Hudson & Young
ATTORNEYS.

Patented May 25, 1954

2,679,472

UNITED STATES PATENT OFFICE 2,679,472

SEPARATION OF HYDROCARBONS BY AZEOTROPIC DISTILLATION

James W. Tooke, Bartlesville, Okla., assignor to Phillips Petroleum Company, a corporation of Delaware Application December 10, 1951, Serial No. 260,844

5 Claims. (Cl. 202—42)

This invention relates to the separation of hydrocarbons by means of distillation. In one aspect it relates to a process for the separation of difficultly separable hydrocarbons by distillation. In another aspect it relates to a process for the separation of such hydrocarbons by azeotropic distillation using acetonitrile as a vapor entrainer.

The separation of volatile compounds by azeotropic distillation is well known and is practiced to effect separations which are difficult or even impossible by ordinary distillation methods. The mixtures of volatile compounds in many instances have such volatility characteristics that ordinary distillation yields only one component of acceptable purity, and in some instances substantially no separation at all is effected. This difficulty in effecting separation by fractional distillation may be due to the formation of constant boiling mixtures or azeotropes, or it may be that the boiling points of the components are so close together that columns of a practical number of plates are ineffective. In order to separate such mixtures, solvent extraction or azeotropic distillation processes may be used. In the process of azeotropic distillation, an additional volatile component is added which so alters the volatilites of the original constituents that satisfactory separation in a fractionating column of a practical number of plates becomes possible. In order for azeotropic distillation to be useful, separation and recovery of the entrainer from the products must be possible. Most azeotropes, as is well known, are of the low boiling or minimum boiling point type, although some high boiling or maximum boiling point ones are known. In this type of distillation, the entrainer is added to the system and it preferentially azeotropes with one or more of the components, during the distillation. The azeotrope of the entrainer with one or more components of the mixture has a greater volatility than the remaining component or components and/or azeotropes thereof. Upon separation of the entrainer from the azeotropic mixture by any of various known means, the separation of the original mixture has been effected. In case any entrainer remains in solution in the still bottoms, it may be separated therefrom to complete the separation and recovery process. Frequently, however, the amount of entrainer employed is adjusted so that substantially all is taken overhead and the kettle product is substantially entrainer-free.

This invention relates to a new process for the separation of cyclohexane from natural mixtures with paraffins having vapor pressures which are about the same, or form azeotropes therewith and the complete separation of which by ordinary fractionation methods is extremely difficult and often impossible. These paraffins are the isoparaffins, 2,4- and 2,2-dimethylpentane.

Cyclohexane is a valuable naphthene for blending aviation fuels and it occurs naturally in relatively small amounts in such complex hydrocarbon mixtures as natural and straight run gasolines. 2,2-dimethylpentane and 2,4-dimethylpentane are also present in such gasolines. The complexity of such mixtures requires very efficient fractionation to accomplish even a partial separation, but final products of high purity cannot be obtained by fractionation alone.

I have found a new process in which I use acetonitrile as a vapor entrainer under certain conditions which operation enables me to isolate cyclohexane of high purity from the dimethylpentanes in an economical and practical manner.

An object of my invention is to provide a process for the separation and recovery of cyclohexane from gasoline fractions containing cyclohexane and other hydrocarbons.

Another object of my invention is to provide a process for separating cyclohexane from admixtures of other hydrocarbons of similar boiling points by distillation methods.

Still another object of my invention is to provide such a process, the equipment for which is relatively simple and inexpensive to construct and the process of which is economical to operate.

Still other objects and advantages of my invention will be realized upon reading the following disclosure, which taken with the attached drawing forms a part of this specification.

The drawing represents in diagrammatic form one embodiment of apparatus which can be used to practice the process of my invention.

The difficulties involved in obtaining an efficient separation will be realized by a consideration of the boiling points of the hydrocarbons in question. At standard atmospheric pressure the hydrocarbons have boiling points as given in the following tabulation:

| Hydrocarbon | Boiling point, ° F. |
|---|---|
| 2,2-dimethylpentane | 174.57 |
| 2,4-dimethylpentane | 176.92 |
| Cyclohexane | 177.33 |

However, the separation is much more difficult than would be anticipated even with these very close boiling points, inasmuch as apparently a constant-boiling mixture is formed between the hydrocarbons.

In my process I have devised means for separating the cyclohexane hydrocarbon from the difficulty separable above mentioned dimethylpentanes. Referring now to the drawing, reference numeral 11 identifies a more or less conventional azeotropic distillation column which is equipped with an overhead vapor takeoff line 12, a liquid bottoms removal line 15 and a feed inlet line 9. To the top portion of the column is attached a pipe 14 in case it is desired to reflux the column. A conduit 19 is attached to about a midpoint of the column for addition of vapor entrainer in case it is desired to add vapor entrainer at the feed level of the column in place of or in addition to vapor entrainer added via line 10. Reference numeral 22 identifies a phase separator in which it is intended that overhead condensate be separated into two liquid phases. Vessel 24 is another azeotropic distillation column which is provided with an overhead vapor takeoff line 25, a feed inlet line 23 and a bottoms product withdrawal line 29. Column 31 is also an azeotropic distillation column provided with a vapor takeoff line 26, a feed inlet line 17 and a bottoms withdrawal line 34. Elements 5, 13, 27 and 32 are condensers intended for the condensation of the overhead vaporous materials for production of reflux liquids. Column 2 is a distillation for preparation of feed stock for the azeotrope column 11. The remaining apparatus parts will be described in the following explanation of the operation of the process.

A feed stock containing such a mixture of hydrocarbons as given in the example hereinbelow, is introduced from a source, not shown, through a line 1 into the still 2. This still is so operated that the dimethylcyclopentanes, and the 2,3- and 3,3-dimethylpentanes are removed as kettle product while the n-hexane, methylcyclopentane, 2,2- and 2,4-dimethylpentanes and the cyclohexane are removed in the overhead product through line 3. A sufficient proportion of this overhead material is condensed in the condenser 5 and the condensate added through a reflux line 6 and sufficient heat from a reboiler coil 7 is added to effect the desired separation. The 2,3- and 3,3-dimethylpentanes and the dimethylcyclopentanes are removed from the still's kettle through the bottoms drawoff line 4 and passed to such disposal as desired.

The remainder of the overhead material passing through line 3 is passed on through lines 8 and 9 into the azeotrope still 11 as charge stock. This charge stock will contain, in addition to other hydrocarbons, 2,2-dimethylpentane, 2,4-dimethylpentane and cyclohexane. Added with the feed stock flowing through line 9 and originating from the source, not shown, or from a line 8, is a quantity of acetonitrile for use as a vapor entrainer. The acetonitrile may alternately be introduced into the column through the line 19. As will be subsequently described the main portion of the entrainer will be added through this line 19 as recycle material. Sufficient reboiling heat from a source, not shown, is introduced into the kettle section of column 11 by means of the reboiler coil 18 and sufficient cooling is added as liquid reflux through a line 14 for properly cooling the top of the tower to provide effective distillation conditions. A hydrocarbon stream depleted in cyclohexane is removed from the top of the column 11 through the vapor line 12. That vaporous material not required for refluxing is passed on through line 12, condensed in condenser 20 and condensate is passed on through line 21 into the accumulator or phase separator vessel 22. In this vessel 22 two liquid phases accumulate. The upper phase 36 comprise hydrocarbons depleted in cyclohexane and containing some acetonitrile in solution, while the lower liquid phase 37 comprises liquid acetonitrile containing some hydrocarbons in solution. Since the solubility of the hydrocarbons in liquid acetonitrile is relatively low, this liquid phase 37 is suitable for removal through line 19 and for passage therethrough into the azeotropic column 11 as the aforementioned and main quantity of vapor entrainer. Makeup acetonitrile as required for continuous operation may be added to the system through the line 10 from a source, not shown.

The upper liquid layer 36 in the phase separator 22 as mentioned hereinabove contains hydrocarbons depleted in cyclohexane with some acetonitrile in solution and this material is withdrawn from vessel 22 through line 23 and is introduced into the distillation column 24. Sufficient reboiling heat from coil 30 and sufficient reflux from line 28 are added to this column to distill overhead through line 25 all the acetonitrile in the column's feed with sufficient hydrocarbon for azeotroping purposes. Since the proportion of acetonitrile in the charge to this column is relatively small the amount of azeotrope removed overhead from this column will likewise be relatively small. This small amount of azeotrope from line 25 is passed through a line 26 and is added to feed material in line 8. This combined stream is the feed to the main azeo column 11. The hydrocarbons in the feed stream entering the column 24 over that required to azeotrope with the small content of acetonitrile is removed as bottoms product from column 24 through the bottoms drawoff line 22. This material is passed to storage or subsequent use, not shown, and constitutes one product of the process.

The bottoms product resulting from the distillation operation carried out in column 11 is removed from this column through a line 15 and may be passed on through a line 16 to storage or subsequent use, not shown, and as the main product of the operation. In case the proportion of vapor entrainer used in column 11 is just sufficient to azeotrope with all the hydrocarbons excepting the cyclohexane of the feed stock or if a slight deficiency of acetonitrile is used there will not be any acetonitrile in the bottoms product removed through line 15 and under this condition the cyclohexane enriched product is withdrawn via line 15 is a finished product of the process.

However, if an excess of acetonitrile is introduced into column 11 the excess will be contained in the cyclohexane bottoms product and will be removed with the cyclohexane bottoms through line 15. In this case it is necessary to remove the acetonitrile from the cyclohexane material before this hydrocarbon can be considered a satisfactory plant product. Furthermore, it is desired that all acetonitrile be recovered for cyclic use in the process. For recovering the acetonitrile content of the bottoms material passing through line 15 this material is passed through a line 17 containing a valve 38 and is introduced into the azeotrope column 31. In this column sufficient reboiling heat from a coil 35 and sufficient reflux from a line 33 are added to azeotrope the entire acetonitrile content with a portion of the cyclohexane and the azeotrope is removed from column 31 through an overhead vapor line 26. This azeotrope is passed on through lines 8 and 9 as a portion of the feed to the main azeotrope column 11. The amount of cyclohexane-acetonitrile azeotrope recycled in this manner is not great since it is preferable to control the acetonitrile to still 11 so that there will not be much acetonitrile for removal with the cyclohexane bottoms from still 11. The bottoms material accumulating in the kettle section of column 31 will comprise the cyclohexane product which is removed through line 34 for passage to storage or such disposal as desired. Since in ordinary operation if any excess acetonitrile is introduced to column 11 over that required for azeotroping with the n-hexane, methylcyclopentane, the 2,2- and 2,4-dimethylpentanes, this excess will be relatively small and accordingly the amount of azeotrope taken overhead from column 31 through line 26 will be relatively small. This material is passed on through lines 26 and 8 and added to the original azeotrope column 11 with the feed in line 9 or at some point near the feed point.

If however only sufficient acetonitrile is charged to column 11 to completely azeotrope with the above mentioned hydrocarbon content or if a slight deficiency of acetonitrile is used the azeotrope distillation column 31 and its auxiliary parts will not be needed and accordingly the first cost and operating costs of the process will be materially reduced.

As an example of the use of acetonitrile as a vapor entrainer for the recovery of cyclohexane from a hydrocarbon fraction containing also the above mentioned dimethylpentanes I submit the following example.

EXAMPLE

Several fractionations were made on a sample of cyclohexane concentrate produced from a Borger, Texas, natural gasoline. All fractionations were carried out in a batch still with a column 6 inches in diameter and with a section 26 feet, 8 inches long packed with ceramic Berl saddles. The reflux ratio was from 50 to 1 to 80 to 1. In the case of the straight fractionation the cyclohexane concentrate was placed in the still, the still brought to equilibrium and overhead fractions representing approximately 2 per cent of the charge were collected. The fractions were examined for boiling point, specific gravity, refractive index and in some cases freezing points. From these data the composition of each fraction was estimated. In the case of the azeotropic distillation with acetonitrile the same procedure was used except that at the beginning of the fractionation the hydrocarbon charge plus acetonitrile was placed in the kettle and then the still brought to equilibrium. The overhead fractions were first freed of acetonitrile and then examined for physical properties and a composition estimated. The cyclohexane concentrate used as a feed in this experiment had the following composition: (normal boiling points of the hydrocarbons are also listed)

| Component | Volume, percent | Boiling Point, ° F. |
|---|---|---|
| n-hexane | 0.8 | 155.74. |
| Methylcyclopentane | 6.6 | 161.27. |
| 2,2- and 2,4-dimethylpentane | 8.6 | 174.57, 176.92, resp. |
| cyclohexane | 72.9 | 177.33. |
| 3,3- and 2,3-dimethylpentane | 6.6 | 186.93, 193.62, resp. |
| Dimethylcyclopentanes | 4.5 | 190. |

The results of the fractionation are given below in terms of yield of cyclohexane at several levels of purity. The cyclohexane containing fractions were the final fractions taken overhead since the acetonitrile azeotropes preferentially with the other hydrocarbons.

*Yield of cyclohexane*

| Cyclohexane Purity | Straight Fractionation | Azeotropic Distillation with Acetonitrile |
|---|---|---|
| *Percent* | *Percent* | *Percent* |
| 99 | none | 25.1 |
| 95 | 42.0 | 52.1 |
| 90 | 67.9 | 73.7 |
| 85 | 85.0 | 86.0 |

It is evident that with straight fractionation alone it was not possible to produce cyclohexane having a purity of 99 per cent or higher. It was possible, however, to produce cyclohexane with a purity of 95 per cent. With acetonitrile as an entrainer, good yields of cyclohexane having a purity of 99 per cent or higher as a kettle product were obtained. Acetonitrile as an entrainer also increased the yield appreciably. Thus, it is seen that acetonitrile has a beneficial effect upon the volatility characteristics and permits improved yields of cyclohexane of improved purity.

By the term narrow boiling range fraction of gasoline is meant such a fraction of gasoline as may boil within a range of about 8° to 10° F. or less. In the above mentioned gasoline fraction the n-hexane and the methylcyclopentane may be separated by simple fractional distillation, or preferably the 3,3- and 2,3-dimethylpentanes and the dimethylcyclopentane may be separated as a kettle product. I prefer to operate using this latter procedure. When this preferred procedure is used, then upon addition of acetonitrile to the distillate, the cyclohexane remains as a kettle product. While my process may be used for separating cyclohexane from such a composition of hydrocarbons my process may also be used for separating for example cyclohexane from the 2,2- and/or 2,4-dimethylpentanes. It is immaterial how close together the boiling points of the cyclohexane and the 2,2- and 2,4-dimethylpentanes are since the vapor entrainer, acetonitrile, operates to alter the relative volatilities of these several compounds. The acetonitrile so alters the relative volatilities of these compounds that the relative volatility of the cyclohexane is decreased to such an extent that the cyclohexane remains as kettle product in the main azeotrope column 11 and the relative volatilities of the 2,2- and 2,4-dimethylpentanes are increased to such an extent that these pentanes are removed from this column in the overhead product.

As another embodiment of my invention, I can charge the above mentioned gasoline fraction containing all the listed hydrocarbons with acetonitrile to the main azeotrope column. In this case the cyclohexane, and the 2,3- and 3,3-dimethylpentanes are removed as bottoms from the azeo column, the acetonitrile having azeotroped the other hydrocarbons. This bottoms is then distilled to remove solution acetonitrile, after which operation the cyclohexane can be separated from the 2,3- and 3,3-dimethylpentanes by simple fractional distillation, the former passing overhead.

While the process of my invention may be used for separating components of a narrow boiling range hydrocarbon fraction it may also be used for merely separating difficultly separable hydrocarbons. For example, two hydrocarbons may differ from each other quite appreciably in boiling points and yet their separation by fractional distillation of a mixture of the two will be substantially impossible. Such a case can occur when the two hydrocarbons form an azeotrope. When this condition occurs both of the hydrocarbons irrespective of their individual boiling points will distill overhead as a constant boiling mixture of constant composition dependent upon the pressure maintained in the still. Thus by the term difficultly separable hydrocarbons as used throughout this specification and claims is meant two or more hydrocarbons which are difficult to separate by distillation means because of the formation of an azeotrope or because boiling points are very close together. By the term narrow boiling range hydrocarbon fraction is meant a fraction of hydrocarbons, the components of which have boiling points so near one another that it is practically impossible to effect a separation by conventional distillation methods.

Equipment for carrying out the process of my invention may be selected from that commercially available, taking into account any corrosive nature of any of the materials being processed. Such auxiliary apparatus as valves, pumps, meters, temperature and pressure recording and controlling devices, flow meters and controllers are not shown on the drawing or described in the specification for purposes of simplicity. The need of such auxiliary apparatus, its installation and use are well understood by those skilled in the art.

While certain embodiments of the invention have been described for illustrative purposes, the invention obviously is not limited thereto.

I claim:

1. In the refining of hydrocarbons the improvement comprising subjecting a narrow boiling range mixture of hydrocarbons comprising 2,2- and 2,4-dimethylpentanes and cyclohexane to distillation conditions in the presence of acetonitrile, recovering cyclohexane from the kettle product and recovering said dimethylpentanes from the overhead distillate.

2. In the refining of hydrocarbons the improvement comprising subjecting a narrow boiling range fraction of gasoline comprising 2,2- and 2,4-dimethylpentanes and cyclohexane to distillation conditions in the presence of acetonitrile, recovering cyclohexane from the still bottoms and said dimethylpentanes from the overhead condensate.

3. A method for separating 2,2- and 2,4-dimethylpentane, and cyclohexane from a narrow boiling range fraction of gasoline comprising said dimethylpentanes and cyclohexane, comprising subjecting said gasoline fraction to distillation conditions in the presence of acetonitrile as an entrainer and thereby producing a first overhead vaporous product and a liquid bottoms product, withdrawing the liquid bottoms product comprising said cyclohexane as one product of the process, condensing the overhead vaporous product, from the condensate separating a first liquid phase comprising said dimethyl-pentanes containing dissolved acetonitrile and a second liquid phase comprising acetonitrile containing dissolved dimethylpentanes, returning said second liquid phase to the distillation operation as said entrainer, distilling said first liquid phase to produce a second vaporous overhead product and combining same with said gasoline fraction and to produce a second still bottoms and recovering this second still bottoms comprising said dimethylpentanes as a second product of the process.

4. In the method of claim 3, wherein just sufficient acetonitrile is used in the first mentioned distilling operation to produce an azeotrope with the dimethylpentane content of the gasoline fraction.

5. A method for separating 2,2- and 2,4-dimethylpentanes, and cyclohexane from a narrow boiling range fraction of gasoline comprising said dimethylpentanes and cyclohexane, comprising subjecting said gasoline fraction to distillation conditions in the presence of an excess of acetonitrile as a vapor entrainer over that required to azeotrope with said dimethylpentanes and thereby producing a first overhead vaporous product and a first liquid bottoms, condensing the overhead vaporous product, from the condensate separating a first liquid phase comprising said dimethylpentanes containing dissolved acetonitrile and a second liquid phase comprising acetonitrile containing dissolved dimethylpentanes, returning said second liquid phase to the distillation operation as said entrainer, distilling said first liquid phase to produce a second vaporous overhead product and combining same with the gasoline fraction feed and to produce a second still bottoms and recovering this second still bottoms comprising said dimethylpentanes as a second product of the process, subjecting said first liquid bottoms to distillation conditions and from this operation separating a third vaporous overhead product and a third bottoms product, combining this third overhead product with the original gasoline feed stock, and recovering the third bottoms product as a second product of the process comprising said cyclohexane.

References Cited in the file of this patent

UNITED STATES PATENTS

| Number | Name | Date |
|---|---|---|
| 2,463,479 | Denton et al. | Mar. 1, 1949 |
| 2,540,318 | Birch et al. | Feb. 6, 1951 |

OTHER REFERENCES

Mair et al., "Separation of Hydrocarbons by Azeotropic Distillation," Journal of Research of the National Bureau of Standards, vol. 27, No. 1, pages 39–63, pages 49–54 relied on.